United States Patent [19]

Cosentino

[11] 3,915,154
[45] Oct. 28, 1975

[54] METHOD AND APPARATUS FOR BIO-ELECTRICAL SIGNAL MEASUREMENT

[75] Inventor: Louis Ciro Cosentino, Wayzata, Minn.

[73] Assignee: Hoffman-La Roche Inc., Nutley, N.J.

[22] Filed: May 8, 1974

[21] Appl. No.: 468,056

Related U.S. Application Data

[63] Continuation of Ser. No. 248,379, April 28, 1972, abandoned, which is a continuation of Ser. No. 130,747, April 2, 1971, abandoned.

[52] U.S. Cl. .......................... 128/2.1 A; 128/2.06 B
[51] Int. Cl.² .......................................... A61B 5/04
[58] Field of Search ..... 128/2.06 B, 2.06 G, 2.06 R, 128/2.1 A, 2.1 P, 2.1 R; 321/2; 330/68

[56] References Cited
UNITED STATES PATENTS 3,204,201  8/1965  Bahrs .................................. 330/68
3,500,823  3/1970  Richardson et al. ........... 128/2.06 B
3,522,509  8/1970  Hasenbalg .............................. 321/2
3,690,313  9/1972  Weppner et al. ................ 128/2.06 B

OTHER PUBLICATIONS

Van der Weide et al., Medical & Biological Engineering, Vol. 6, No. 4, Aug. 1968, pp. 447–448 & FIG. 3.

Primary Examiner—William E. Kamm
Attorney, Agent, or Firm—Samuel L. Welt; Bernard S. Leon; Mark L. Hopkins

[57] ABSTRACT

Electrical instrumentation for deriving bio-electrical signals is supplied with an isolated front-end amplifying system enclosed by a floating shield connected to one of the patient leads to provide a high common mode rejection ratio and good isolation, and transformer or other suitable isolation coupling furnishes output signals from the isolated front end to the instrumentation processing circuitry.

8 Claims, 6 Drawing Figures

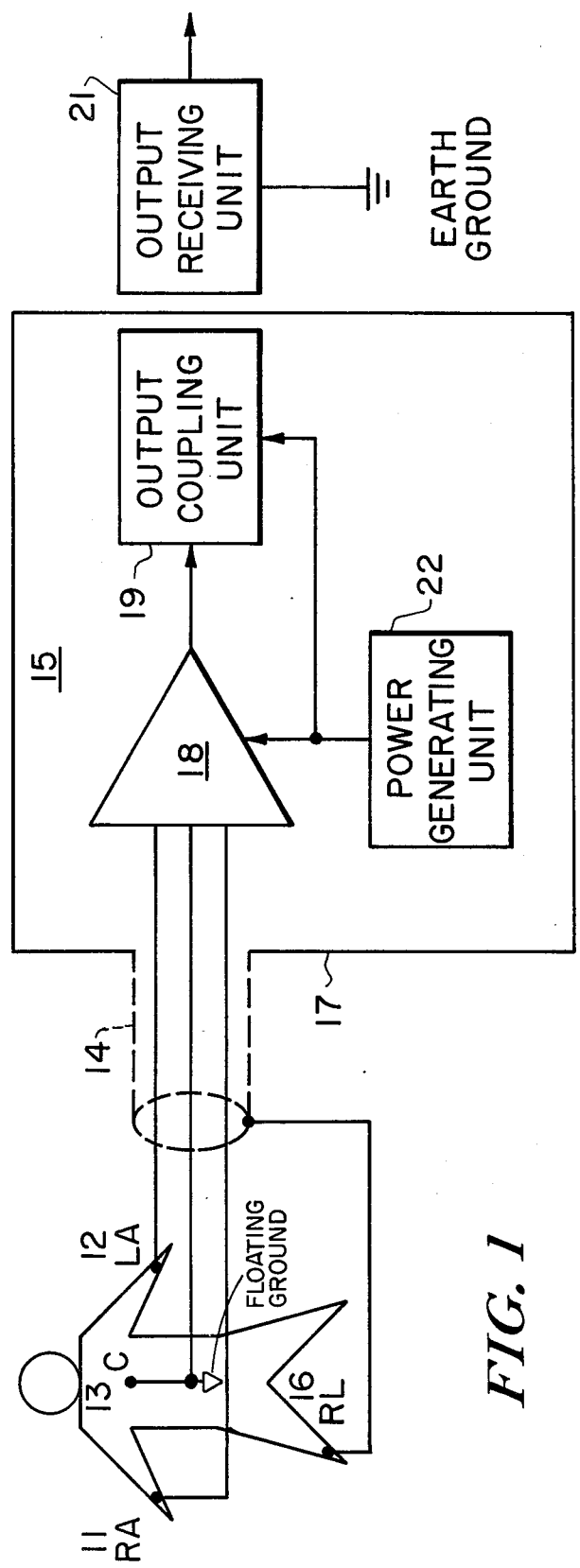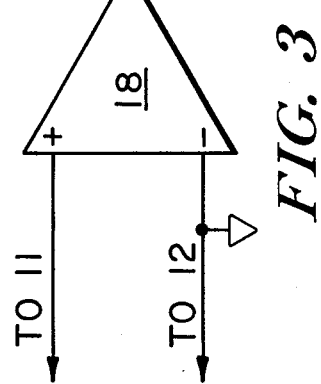
FIG. 1
FIG. 2
FIG. 3

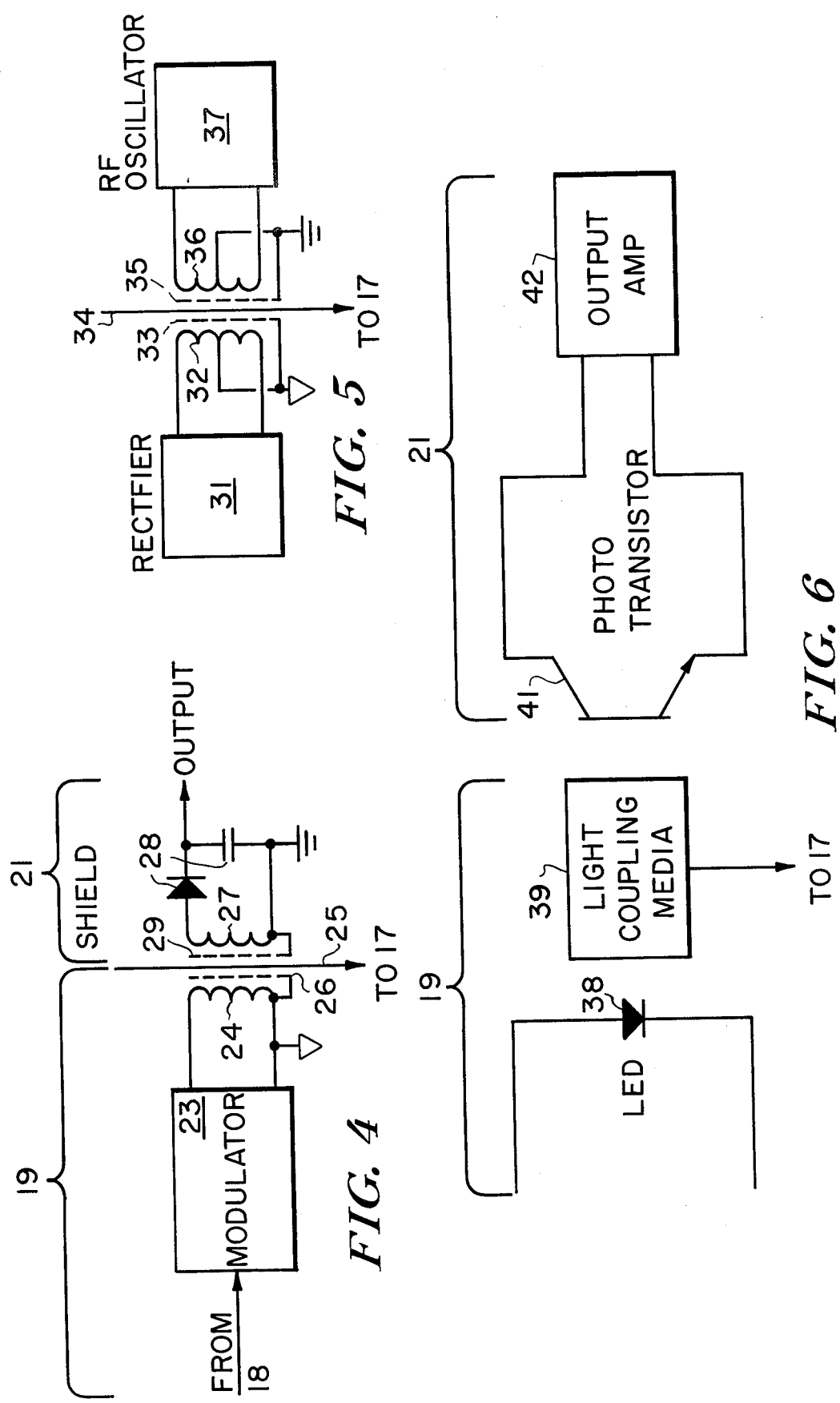

METHOD AND APPARATUS FOR BIO-ELECTRICAL SIGNAL MEASUREMENT

CROSS REFERENCE TO RELATED APPLICATIONS

This application is a continuation of U.S. patent application Ser. No. 248,379, filed on Apr. 28, 1972, which now abandoned, itself, is a continuation application of Ser. No. 130,747, filed Apr. 2, 1971 now abandoned.

BACKGROUND OF THE INVENTION

1. Field of the Invention

This invention relates generally to instrumentation for measuring electrical biological signals and, more particularly, to methods and apparatus for providing safer and more effective means of obtaining these signals.

2. Description of the Prior Art

In the medical electronic device area a significant type of instrumentation employed in this field frequently incorporates high sensitivity amplifiers, such as those used in connection with electrode cardiography, to magnify minute electrical signals generated by the human body to enable these signals to be recorded and observed with a view towards physiological or pathological diagnosis. The problems encountered with such instrumentation are two-fold, including safety and accurate potential measurements.

The first problem results from body potentials accumulated in a patient as a result of his capacitive coupling (assuming isolation from ground) with the electrical noisy environment. The extraneous interfering signals and noise resulting from the electrical noisy environment which are superimposed upon the desired signals, tend to decrease the value and accuracy of the desired signals to various degrees. Accordingly, it is important to eliminate these interfering signals and noise to obtain reliable, accurate data. The second problem concerns the desirability to reduce to a minimum, a current flow that can be safely tolerated by the body to achieve maximum safety. Somehow, the current pathway from the patient to the powerline and/or ground must be severed by an isolation device.

In dealing with the problems delineated above, numerous solutions have been proposed. One, for example, is to utilize a battery for operating all of the instrumentation. However, this does not appear to be practical and would, of course, prohibit interface with the operated equipment. Other approaches are to telemeter all the necessary information by microwave RF or similar means, each of which, of course, contemplates a complicated system that might include a partial battery type operation. More practical methods for obtaining isolation and to some degree overcoming the problems advanced above, involve the use of transformers, semi-conductors and light beams. Use of semi-conductors, such as FET's could be used for isolation, however, at high voltages the device breaks down and may even short, and, therefore, these are unreliable for patient monitoring applications, whereby other problems with other types of semi-conductors are incurred.

SUMMARY

The purpose of the present invention is to obviate the problems encountered by the prior art and to provide a system which provides for patient safety by patient isolation, and optimum common mode rejection to guard against line interference. To accomplish the above, applicant's invention contemplates a clinically safe high performance amplifier system which is referenced to a floating ground coupled with one of the patient electrode leads. A floating shield is connected to another patient electrode lead on the body and has no other reference point.

In preferred embodiments of the invention, either the power and/or the measured bio-potential signal is transmitted from the system each by means of a transformer which utilizes the floating shield as one of its shields. In another aspect of the invention both power and signal transmission can be effected by a single transformer which utilizes the floating shield as one of its shields.

BRIEF DESCRIPTION OF THE DRAWINGS

FIG. 1 is a block diagram of a patient isolation system according to the invention.

FIGS. 2 and 3 illustrate patient lead-amplifier connections respectively using a single ended amplifier and differential amplifier.

FIG. 4 shows one type of output and receiving coupling unit which could be utilized in FIG. 1.

FIG. 5 pictures one embodiment of a coupling unit for transmitting power into the amplifier system 15 of FIG. 1.

FIG. 6 illustrates an optical type of output and receiving coupling unit that could be employed in FIG. 1.

DESCRIPTION OF THE INVENTION

In brief, applicant's invention contemplates a patient connected input amplifier arranged to provide an isolated front end enclosed by a floating shield connected to one of the patient leads, which acts to reduce to a minimum, the amount of common mode current which can flow in the input amplifier leads. Common mode current may be defined as any current produced by an "earth" reference source which current is caused to flow through the patient.

More specifically, the input amplifier section is enclosed by a floating shield connected to one of the patient leads, for example, right leg (RL). A second patient electrode lead, for example, right arm (RA) is connected to the input amplifier. A third patient electrode lead, for example, left arm (LA) is connected from the patient to an amplifier input acting as floating ground (zero points). Electrical power is provided to the isolated front end by batteries, light coupling, transforming means or other techniques; however, transformer coupling with low coupling capacity, at the present, would appear to be the most practical approach. Similarly, a signal path to the earth referenced outside world can be provided by means of light coupling transforming means or other techniques; however, again, transformer coupling with low capacity is, at present the most practical approach.

Assuming provision of the input amplifier system and a transformer coupling unit completely enclosed by the floating RL connected patient reference shield, the effective capacitive coupling between any point of the input amplifier and its zero reference point with the outside earth referenced world is virtually zero. The input amplifier can be said to be completely shielded by the floating shield. Therefore, no common mode current can flow into the isolated input amplifier and back to the earth referenced world. Assuming that the common mode signal E on the patient is the same on any point on the body and, hence, at RL, all the common mode current will flow into the RL lead, out to the floating shield and then back to earth referenced outside world. The input amplifier is then immune to any common mode signal and its common mode rejection ratio approaches infinity. As a consequence of the above, distinct and very accurate biological signals are derived. If the capacity between the floating shield and the outside earth ground is limited to a very low capacity by physical separation, such as transformer coupling, the total amount of common mode current which flows will be so small so as to increase patient isolation from the power line, thus enhancing patient safety.

With reference to the drawings there is shown in FIG. 1 electrodes 11 and 12 respectively connected to RA and LA and electrode 13 is connected to any point C on the patient. All three electrodes are coupled via cable 14 to an isolated amplifier system 15. A fourth electrode 16 connected to RL is coupled through cable 14 to a floating shield 17 made of copper foil or other suitable conductor material, which forms a part of and contains amplifier system 15. The electrodes are coupled to an amplifier 18 which can be of the differential type or of the single ended type. If amplifier 18 is of the differential type its electrode connections via cable 14 are as illustrated in FIG. 2 with electrode 11 coupled to the positive input, electrode 12 coupled to the negative input, and electrode 13 coupled to the amplifier zero signal reference point. If amplifier 18 is of the single ended type, the electrode connections are as illustrated in FIG. 3 with electrode 11 coupled to the positive input and electrode 12 coupled to the negative input which is also the amplifier zero signal reference point. In this case electrode 13 is not needed.

With reference back to FIG. 1, amplifier output 18 in each of the cases described above is connected to output coupling unit 19 which transmits the amplifier 18 output signal to output receiving unit 21 for processing and display by suitable circuitry outside the isolated amplifier system 15. A power generator unit 22 supplies power for driving amplifier 18 and output coupling unit 21.

Output coupling unit 19 and output receiving unit 21 may take on any one of a number of suitable configurations. One of such configurations is illustrated in FIG. 4 where output coupling unit 19 and output receiving unit 21 are of the amplitude modulated (AM) transformer coupled type. Output coupling unit 19 comprises, a modulator 23, primary winding 24, and shield 25, whereby shield 25 is made electrically continuous with floating shield 17. The modulator 23 and one side of primary winding 24 are coupled to the amplifier system zero signal reference point. An extra shield 26, may be added to reduce radiated energy levels inside the amplifier system 15. The output receiving unit 21 comprises a secondary winding 27, demodulator 28 including a diode and capacitor, and optional shield 29. The demodulator 28 and one side of secondary winding 27 are coupled to outside world earth reference. Optional shield 29 would be useful in reducing radiated energy into the receiving side of the system. It is noted that with extra shield 26 and optional shield 29 and floating shield portion 25, a triple shielded transformer is formed. The floating shield portion 25 may be omitted but only at the expense of a reduction in the CMRR.

A power generating unit is pictured in FIG. 5 comprising, a rectifier 31, secondary winding 32, shield 33, and floating shield portion 34 forming a part of the amplifier system 15. Shield 33 and the tapped midpoint of secondary winding 32 are coupled to the amplifier system zero signal reference point. Located outside the amplifier system 15 are a shield 35, primary winding 36 and RF oscillator 37. shield 35 and the tapped midpoint of primary coil 36 are each coupled to the outside world earth reference. Of course, the power generating unit might be comprised of a battery, or be coupled from an outside power source via a photocell arrangement, etc.

In operation, assuming the common mode signal E on the patient is the same at any point on the body including at RL, the common mode current is also channelled through the RL electrode 16 to the floating shield 17. Since the voltage on the equipment at any point within the amplifier system is also at E common mode, common mode current flow inside within the amplifier system 15 is eliminated to provide a common mode rejection ratio approaching infinity, thus avoiding any error or interference signals on the EKG signal being derived between electrodes 11 and 12 which signal is fed out via coupling units 19 and 21 to suitable processing circuitry. At the same time the capacity between the floating shield 17 carrying the common mode current and the outside world earth reference is limited to very low capacity by physical separation such as by the transformer coupling illustrated in FIGS. 4 and/or 5 and other types of coupling described herein. Accordingly, the total amount of common mode current flow to the outside, or the leakage current, will be small, thereby increasing patient isolation from the power line and enhancing patient safety.

An alternative arrangement for output coupling unit 19 and output receiving unit 21 is shown in FIG. 6 where a light coupling unit including a light emitting diode (LED) 38 connected from amplifier 18, and a light coupling media 39 is preferably electrically conductive so as to form a portion of floating shield 17 to maintain its continuity. A photo transistor 41 is positioned at an opposite end of light coupling media 39, from that of LED 38. The output of photo transistor 41 is connected to an output amplifier 42.

I claim:
1. In electrical instrumentation for deriving bioelectrical signals and the like from a patient with at least a three patient lead system, first means including amplifier means adapted for connection with a first one and second one of said leads for producing bioelectrical output signals, second means for processing said signals, and coupling means for coupling said output signals from said first means to said second means via an electrically nonconducting path, the improvement comprising,
electrical floating shield means arranged to be an electrical extension of a third one of said patient leads, said shield means enclosing said first means and shielding the electrical input signal leads thereto and further enclosing the portion of said coupling means electrically coupled to said first means, for virtually eliminating common mode interference by inhibiting patient common mode current from flowing through said first means.

2. In electrical instrumentation according to claim 1 including,
   electrical power supply means forming a part of said second means, and
   second coupling means for transmitting power from said power supply means to said first means via an electrically nonconductive path.

3. In electrical instrumentation according to claim 1 wherein,
   said coupling means comprises shielded high frequency transformer means where at least a single shield of said transformer means is electrically connected with said electrical floating shield means.

4. In electrical instrumentation according to claim 3 wherein,
   the second one of said leads serves as a connection for floating ground reference of said first means, and said second means is adapted for connection to an earth ground reference, and
   said high frequency transformer means includes a first winding outside of said floating shield means for connection to earth ground reference and a second winding within said floating shield means for connection to the floating ground reference.

5. In electrical instrumentation according to claim 1 wherein said coupling means comprises,
   a light emitting unit inside said floating shield and connected from said amplifier means,
   light pick-up means outside of said floating shield, and
   a light conductor optically connected from said light emitting unit to said light pick-up means.

6. In electrical instrumentation according to claim 4 including,
   electrical power supply means forming a part of said second means, and
   second shielded high frequency transformer means for transmitting power from said power supply means to said first means and where at least one shield thereof is electrically connected with said electrical floating shield means.

7. A method for isolating a patient from earth grounded type electrical instrumentation and for accurately measuring patient bio-electrical signals comprising,
   providing an amplifier system for connection to at least first and second patient leads, for deriving such signals whereby one of said leads is referenced as a floating ground,
   coupling the derived signals to said instrumentation via first means providing an electrically nonconductive coupling path, and
   enclosing the amplifying system and the portion of said first means coupled thereto within an electrical floating shield, wherein said shield is an electrical extension of a third patient lead.

8. A method according to claim 7 including,
   utilizing either of the first or second leads as a floating ground potential at a negative input of the amplifier system.

* * * * *